(12) United States Patent
Emilianowicz

(10) Patent No.: US 6,904,676 B2
(45) Date of Patent: *Jun. 14, 2005

(54) METHODS FOR REPLACING A PORTION OF A COMBUSTOR LINER

(75) Inventor: Edward John Emilianowicz, West Chester, OH (US)

(73) Assignee: General Electric Company, Schenectady, NY (US)

(*) Notice: Subject to any disclaimer, the term of this patent is extended or adjusted under 35 U.S.C. 154(b) by 17 days.

This patent is subject to a terminal disclaimer.

(21) Appl. No.: 10/310,571

(22) Filed: Dec. 4, 2002

(65) Prior Publication Data

US 2004/0107575 A1 Jun. 10, 2004

(51) Int. Cl.[7] .............................................. B23P 15/00
(52) U.S. Cl. ............................................... 29/890.01
(58) Field of Search .................... 29/890.01, 402.08, 29/402.09, 402.03, 402.61, 426.4, 402.16, 889, 889.2; 60/757, 558, 750, 752, 754, 39.36

(56) References Cited

U.S. PATENT DOCUMENTS

| | | |
|---|---|---|
| 2,699,648 A | 1/1955 | Berkey |
| 3,842,595 A * | 10/1974 | Smith et al. ............... 60/39.36 |
| 4,162,611 A | 7/1979 | Caruel et al. |
| 4,322,945 A | 4/1982 | Peterson et al. |
| 4,686,823 A | 8/1987 | Coburn et al. |
| 4,766,722 A | 8/1988 | Bayle-Laboure et al. |
| 4,870,818 A | 10/1989 | Suliga |
| 5,117,637 A | 6/1992 | Howell et al. |
| 5,142,871 A | 9/1992 | Lampes et al. |
| 5,154,060 A | 10/1992 | Walker et al. |
| 5,239,816 A | 8/1993 | Holt, III |
| 5,279,127 A | 1/1994 | Napoli |
| 5,291,732 A | 3/1994 | Halila |
| 5,307,637 A | 5/1994 | Stickles et al. |
| 5,323,604 A | 6/1994 | Ekstedt et al. |
| 5,329,761 A | 7/1994 | Ablett et al. |
| 5,479,772 A | 1/1996 | Halila |
| 5,630,319 A | 5/1997 | Schilling et al. |
| 5,657,633 A | 8/1997 | Brueggert |
| 5,894,732 A | 4/1999 | Kwan |
| 5,941,076 A | 8/1999 | Sandelis |
| 6,047,539 A | 4/2000 | Farmer |
| 6,286,317 B1 * | 9/2001 | Burrus et al. ............... 50/752 |
| 6,345,441 B1 * | 2/2002 | Farmer et al. ............. 29/889.1 |
| 6,442,940 B1 | 9/2002 | Young et al. |
| 6,581,285 B2 * | 6/2003 | Emilianowicz .......... 29/890.01 |

FOREIGN PATENT DOCUMENTS

| | | |
|---|---|---|
| DE | 3942271 | 7/1991 |
| EP | 1266718 | 12/2002 |
| EP | 1267127 | 12/2002 |
| EP | 1174209 | 4/2004 |

* cited by examiner

Primary Examiner—Irene Rosenbaum
(74) Attorney, Agent, or Firm—William Scott Andes; Armstrong Teasdale LLP

(57) ABSTRACT

A method facilitates replacing a portion of a gas turbine engine combustor liner. The combustor includes a combustion zone formed by inner and outer liners. The inner and outer liners each include a series of panels, and at least one of the inner and the outer liner includes an aft support coupled to an aft end of liner. The method comprises cutting through at least one of the combustor inner and the outer liner upstream from the liner aft support, removing the combustor liner aft support from the combustor, and installing a replacement aft support within the combustor such that the liner aft support extends aft ward from the portion of the combustor liner that is upstream from the cut.

20 Claims, 4 Drawing Sheets

METHODS FOR REPLACING A PORTION OF A COMBUSTOR LINER

BACKGROUND OF THE INVENTION

This invention relates generally to gas turbine engine, and more particularly, to methods for replacing combustor aft conical datum areas used with gas turbine engines.

A turbine engine includes a compressor for compressing air which is mixed with a fuel and channeled to a combustor wherein the mixture is ignited within a combustion chamber for generating hot combustion gases. At least some known combustors include a dome assembly, a cowling, and liners to channel the combustion gases to a turbine, which extracts energy from the combustion gases for powering the compressor, as well as producing useful work to propel an aircraft in flight or to power a load, such as an electrical generator. The liners are coupled to the dome assembly with the cowling, and extend downstream from the cowling to define the combustion chamber.

At least some known liners include a plurality of panels that are connected together with riveted, bolted, or welded connections. An aft end of at least some known liners is coupled within the engine by a conical datum area. A portion of the panels include cooling nuggets formed between adjacent panels, that extend radially outwardly from the panels and away from the combustion chamber. Accordingly, such cooling nuggets are not subjected to the same degree of heat as portions of the panels adjacent the combustion chamber, and as such, during operation thermal stresses may be induced within the panels. Over time, continued operation with thermal stresses may cause panels to thermally fatigue, causing weakening and/or cracking to develop within the panels. Also the aft conical datum area of the liner may become fatigued during operation, and/or damaged during engine assembly/disassembly.

Current repair methods include welding thermal fatigue cracks. Additionally, patches may be attached to areas of panels that are weakened by thermal stresses. However, if the thermal stresses have induced thermal fatigue or distress in larger areas of the panels or in a plurality of panels, the combustor may not have enough structural integrity within such panels to enable patches to be attached. Also, if the fatigued and/or damaged conical datum area is small enough, the conical datum area may be cold sized. However, depending upon a size of the damaged and/or fatigued area, known cold sizing methods may not be effective in repairing the conical datum areas. In such cases, repair of such panels, and/or conical datum areas, is not a feasible option, and instead the entire combustor liner is replaced. Because the liner is coupled to the cowl and the dome assembly, often the entire combustor must be disassembled for the liner to be replaced. Furthermore, when the fasteners are removed from the cowl and dome assembly, precise dimensional relations between the components may be altered and as a result, special tooling may be required during re-assembly. Thus, replacing a combustor liner including cooling nuggets and a conical datum area may be a time-consuming and expensive process.

BRIEF SUMMARY OF THE INVENTION

In one aspect, a method for replacing a portion of a gas turbine engine combustor liner aft conical datum flange is provided. The combustor includes a combustion zone formed by inner and outer liners. The inner and outer liners each include a series of panels, and at least one of the inner and the outer liner includes an aft support coupled to an aft end of liner. The method comprises cutting through at least one of the combustor inner and the outer liner upstream from the liner aft support, removing the combustor liner aft support from the combustor, and installing a replacement aft support within the combustor such that the liner aft support extends aftward from the portion of the combustor liner that is upstream from the cut.

In another aspect of the invention, a method for replacing a portion of a combustor liner within a gas turbine engine combustor is provided. The combustor includes a combustion zone formed by an inner and an outer liner. The inner and outer liners each include a series of panels. At least one of the inner liner and the outer liner includes a support flange formed at a downstream end of the liner. The method comprises cutting between an outer surface and an inner surface of at least one of the inner and the outer liners, removing the portion of the at least one of the outer and inner liner that is aft of the cut, and installing a replacement liner into the combustor to replace the portion of the liner removed from the combustor.

In a further aspect, a method for replacing a portion of at least one deteriorated combustor liner within a gas turbine engine combustor is provided. The at least one deteriorated liner includes a plurality of cooling features formed by adjacent liner panels. The liner also including an aft end coupled to the combustor by a support flange. The method comprises cutting through the deteriorated liner between from an outer surface of the liner to an inner surface of the liner, removing the portion of the deteriorated combustor liner that is aft of the cut from the combustor, and installing a replacement liner into the combustor to replace the portion of the liner removed from the combustor.

DETAILED DESCRIPTION OF THE INVENTION

Figure 1:
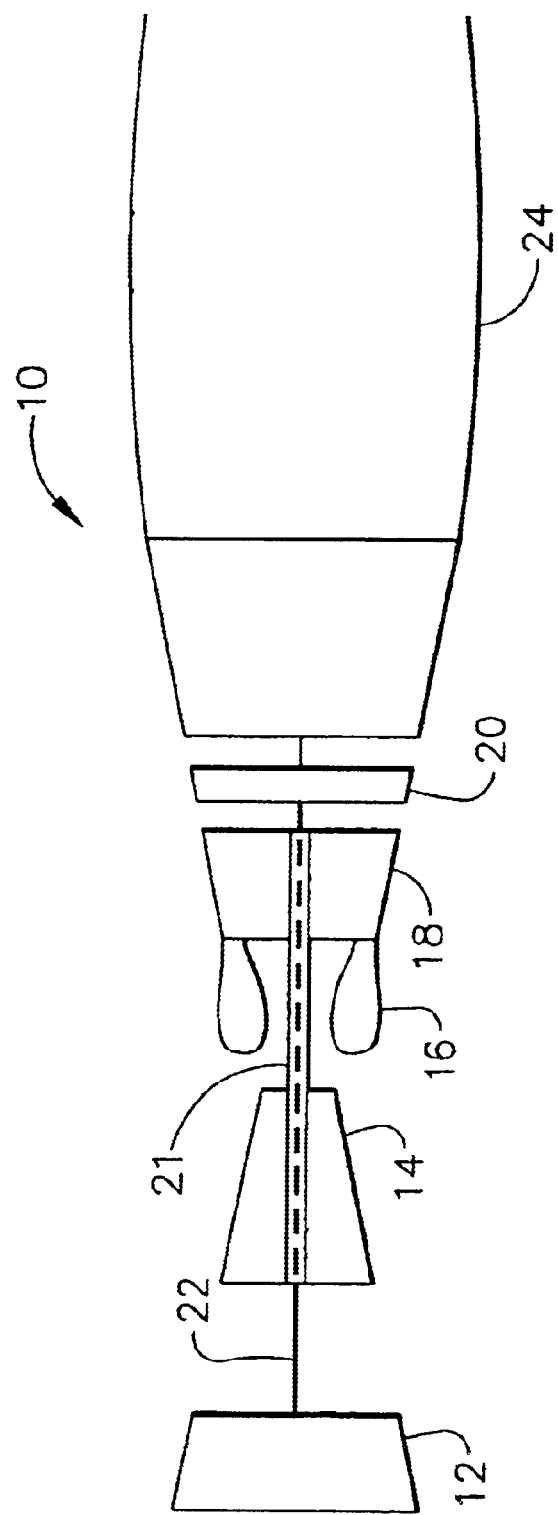
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21. In one embodiment, gas turbine engine 10 is a GE90 engine commercially available from General Electric Aircraft Engines, Cincinnati, Ohio. In another embodiment, gas turbine engine 10 is a CF engine commercially available from General Electric Aircraft Engines, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 2:
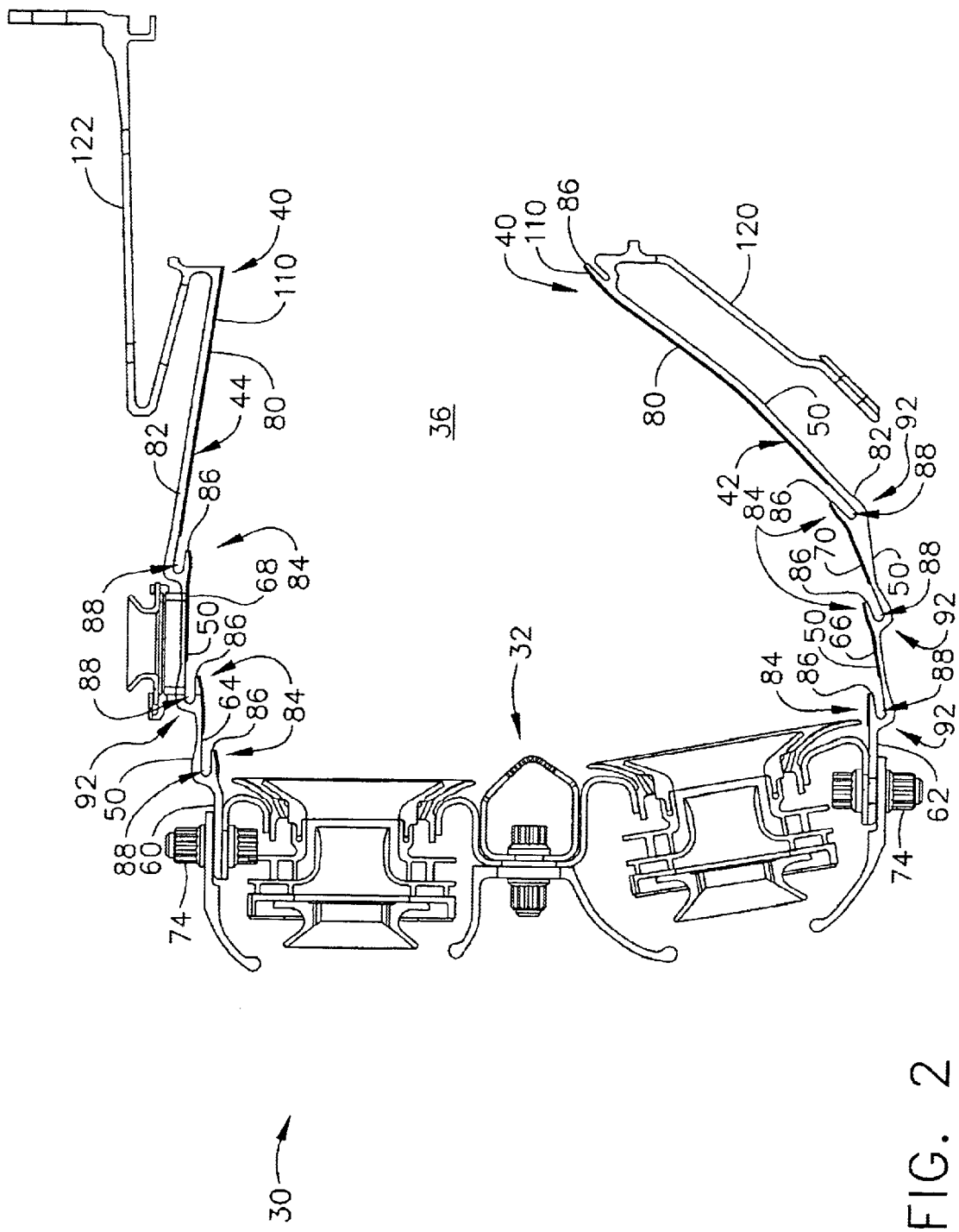
FIG. 2 is a partial cross-sectional view of a combustor assembly that may be used with the gas turbine engine shown in FIG. 1.
Figure 3:
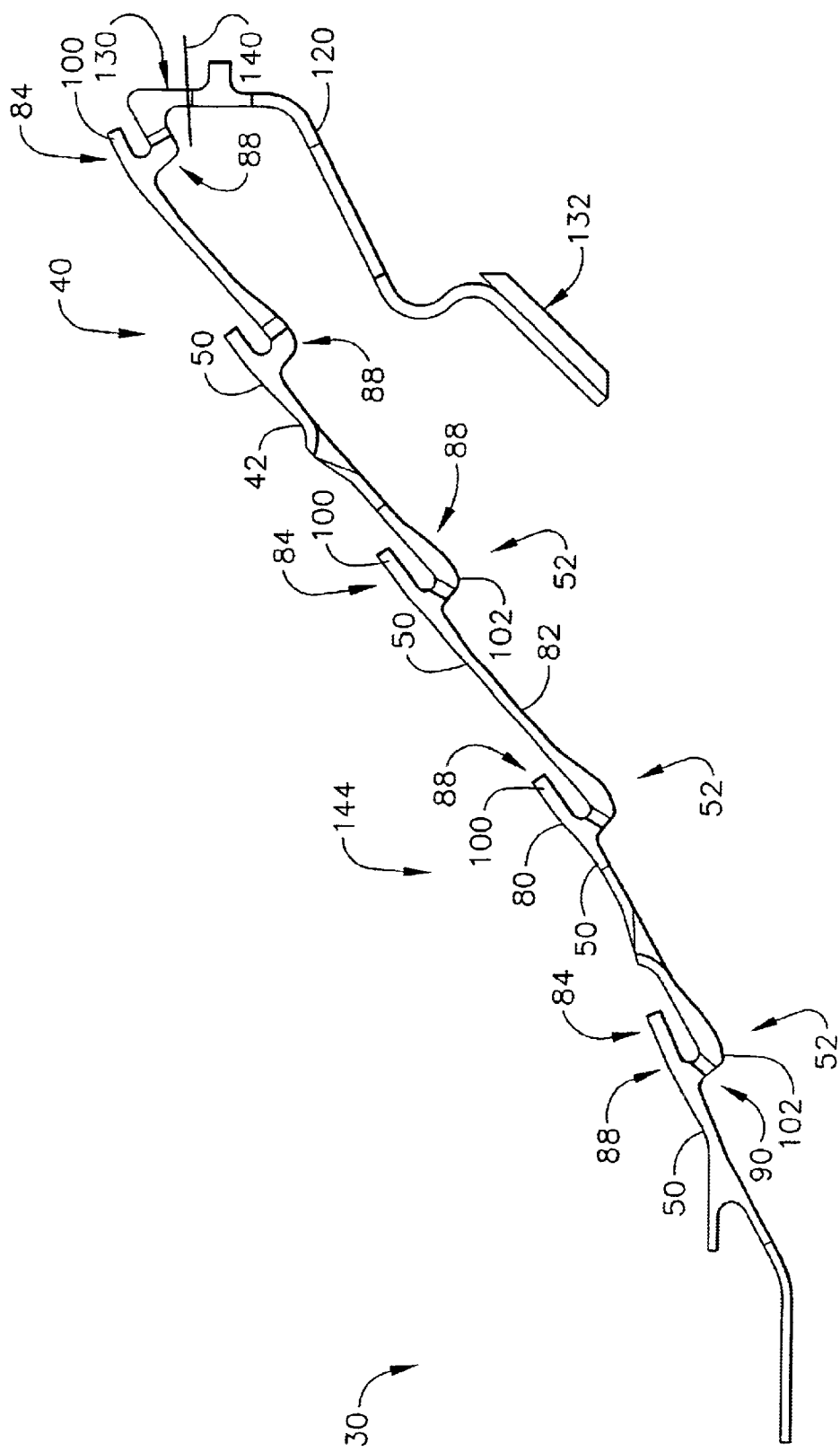
FIG. 3 is an enlarged view of a combustor liner used with the combustor shown in FIG. 2 taken along area 3.

FIG. 2 is a partial cross-sectional view of a combustor 30. FIG. 3 is an enlarged view of a portion of combustor 30.

Combustor 30 may be used with gas turbine engine 10 shown in FIG. 1, and includes a dome assembly 32. A fuel injector (not shown) extends into dome assembly 32 and injects atomized fuel through dome assembly 32 into a combustion zone 36 of combustor 30 to form an air-fuel mixture that is ignited downstream of the fuel injector.

Combustion zone 36 is formed by annular, radially outer and radially inner supporting members (not shown) and combustor liners 40. Combustor liners 40 shield the outer and inner supporting members from the heat generated within combustion zone 36 and includes an inner liner 42 and an outer liner 44. Each liner 42 and 44 is annular.

Liners 42 and 44 define combustion zone 36. Combustion zone 36 extends from dome assembly 32 downstream to a turbine nozzle (not shown). Outer and inner liners 44 and 42 each include a plurality of separate panels 50 which include a series of steps 52, each of which form a distinct portion of combustor liner 40.

Outer liner 44 and inner liner 42 each include a bolt band 60 and 62, respectively, and a first panel 64 and 66, respectively. Outer bolt band 60 and inner bolt band 62 are positioned adjacent to dome assembly 32 and extend downstream from dome assembly 32 to first panels 64 and 66, respectively. First panels 64 and 66 are connected downstream from bolt bands 60 and 62, respectively. Each adjacent downstream panel 50 is numbered sequentially, such that second panels 68 and 70 are connected downstream from respective first panels 64 and 66. Bolt bands 60 and 62 include a plurality of openings 72 sized to receive fasteners 74 therethrough. Fasteners 74 secure liners 42 and 44, bolt bands 60 and 62, and a cowl assembly 78 to dome assembly 32.

Each combustor panel 50 includes a combustor liner surface 80, an exterior surface 82, and an overhang portion 84. Combustor liner surface 80 extends from dome assembly 32 to the turbine nozzle. Combustor liner surface 80 and exterior surface 82 are connected together at overhang portion 84 and form a rear facing edge 86. A plurality of air cooling features 88 separate adjacent combustor panels 50.

Air cooling features 88 include openings 90 which receive air therethrough from an air plenum (not shown) such that a thin protective boundary of air is formed between high temperature combustion gases and combustor liner surface 80. Furthermore, openings 90 permit convective cooling of combustor liner 40. Specifically, openings 90 extend through features 88 which are formed between adjacent panels 50 and radially inward from nuggets 92 formed by adjacent panels 50. Panels 50 are connected serially, such that each panel downstream end 100 is connected to an upstream end 102 of an adjacent downstream panel 50. Nuggets 92 are formed between adjacent connected panels respective downstream and upstream ends 100 and 102.

Liner multinugget region 46 includes a plurality of nuggets 92. In the exemplary embodiment, region 46 includes three nuggets 92. Liner multihole region 48 includes a plurality of openings (not shown).

A layer 110 of thermal barrier material is applied on combustor liner surface 80. Thermal barrier material further insulates combustor liner surface 80 from high temperature combustion gases. In an exemplary embodiment, thermal barrier coating material is commercially available from Englehart Industries, Wilmington Mass.

Each liner 42 and 44 also includes an annular support flange, or aft flange, 120 and 122, respectively. Specifically, each support flange 120 and 122 couples an aft end 124 and 126 of each respective liner 42 and 44 to the turbine nozzle assembly. More specifically, each support flange 120 includes a radial portion 130 and a conical datum area 132. Each radial portion 130 extends radially inwardly from an aft combustor inner liner panel 50 at inner liner aft end 124. Conical datum area 132 extends obliquely upstream and from aft flange 120 with respect to an axis of rotation of gas turbine engine 10. Conical datum area 132 provides a mounting surface 130 that is used to securely fasten liner 42 to the turbine nozzle assembly.

During operation, as atomized fuel is injecting into combustion zone 36 and ignited, heat is generated within zone 36. Although air enters combustion zone 36 through cooling features 88 and forms a thin protective boundary of air along combustor liner surface 80, a variation in exposure of combustor liner surfaces to high temperatures may induce thermal stresses into liners 40. As a result of continued exposure to thermal stresses, over time, liners 40 may become deteriorated.

Deteriorated regions of combustor liners 40 may be removed and replaced using the methods described herein. More specifically, deteriorated regions of inner liner 42 may be removed and replaced using the methods described herein. If a field returned engine, such as engine 10, includes an aft portion of inner liner 42 is deteriorated, a circumferential cut is made through combustor liner 40. Specifically, as shown in FIG. 3, the cut is made through inner liner support flange 120, as illustrated with line 140, such that the cut extends from liner exterior surface 82 to liner interior surface 80, and such that a portion 144 of liner 40 remains secured within combustor 30. More specifically, the cut is made through support flange radial portion 130 such that support flange 120 is removable from combustor 30 or liner 144.

After deteriorated regions of liner 40 are removed from combustor 30, a replacement liner (not shown) may be coupled to combustor liner 42. The replacement liner includes a support flange 120, and is sized substantially identical to the deteriorated region of liner 42 being replaced, such that liner 42 is returned to substantially the original predefined dimensional requirements.

The replacement liner is then welded into combustor liner 42, such that the replacement liner is welded to an existing portion of liner 42. More specifically, an upstream side (not shown) of the replacement liner is welded to a downstream side of the existing portion of liner 40. In one embodiment, electron beam, EB welding is used to secure the replacement liner within combustor 30. In another embodiment, tungsten inert gas, TIG, welding is used to secure the replacement liner within combustor 30. The replacement support flange is recoupled to the turbine nozzle assembly, and thermal barrier coating material may then be applied on replacement liner surface 80. In one embodiment, the replacement liner includes material upgrades to facilitate extending a useful life of combustor 30. In another embodiment, the replacement liner includes cooling upgrades, including, but not limited to relocations, resizing, and changes in the number of cooling features 88.

Because deteriorated liners are replaced using the method described herein, combustors 30 are returned to service using a replacement process that facilitates improved savings in comparison to removing and replacing entire combustor liners 42. Furthermore, because the replacement liners are formed to be substantially identical to originally installed liners 42, aerodynamic performance and combustor performance are not adversely impacted by the replacement liners.

Figure 4:
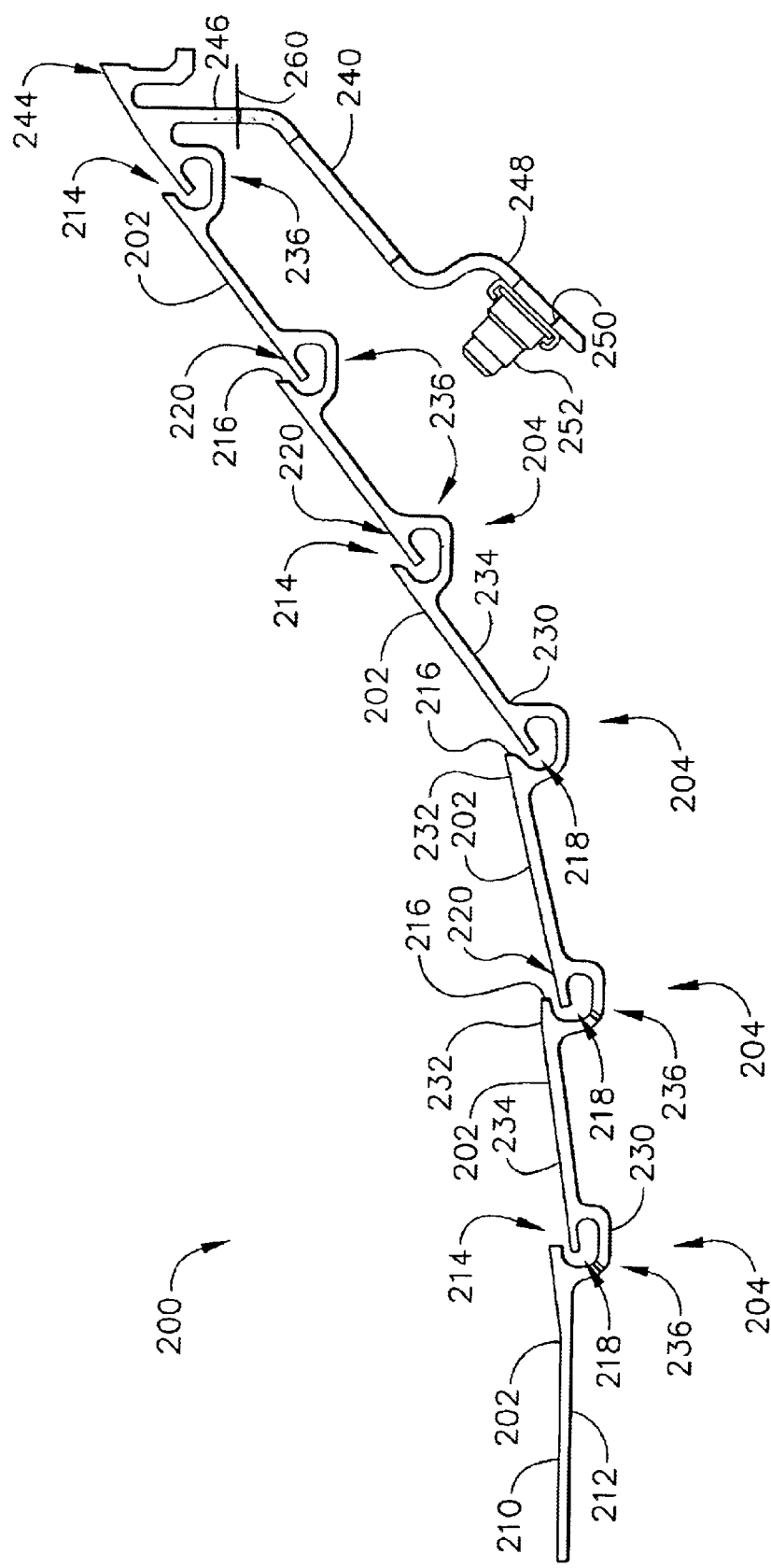
FIG. 4 is an enlarged cross-sectional view of an alternative embodiment of a combustor liner that may be used with the gas turbine engine shown in FIG. 1.

FIG. 4 is an enlarged cross-sectional view of an alternative embodiment of an inner combustor inner liner 200 that may be used with gas turbine engine 10 (shown in FIG. 1). Liner 200 is substantially similar to liner 42 (shown in FIGS. 2 and 3), and is installed within a combustor (not shown), such as combustor 30 shown in FIGS. 2 and 3. Inner liner 200 includes a plurality of panels 202 which include a series of steps 204, each of which form a distinct portion of combustor liner 200.

Panels 202 are connected serially, and each panel 202 includes a combustor liner surface 210, an exterior surface 212, and an overhang portion 214. Combustor liner surface 210 extends from a dome assembly (not shown) to a turbine nozzle assembly (not shown). Combustor liner surface 210 and exterior surface 212 are connected together at overhang portion 214 and form a rear facing edge 216. A plurality of air cooling features 218 separate adjacent combustor panels 202.

Air cooling features 218 include a plurality of openings 220 which receive air therethrough from an air source (not shown) such that a thin protective boundary of air is formed between high temperature combustion gases and combustor liner surface 210. Openings 220 are known as dilution openings and extend between liner surface 210 and exterior surface 212 to facilitate mixing of combustion gases within the combustor. In the exemplary embodiment, openings 220 are substantially circular. Specifically, each panel 202 includes an upstream end 230, a downstream end 232, and a body 234 extending therebetween. Panels 202 are connected, such that each panel downstream end 232 is connected to an upstream end 230 of an adjacent downstream panel 202. Nuggets 236 are formed between adjacent connected panels respective downstream and upstream ends 232 and 230. Nuggets 236 are known as super slot nuggets. In the exemplary embodiment, liner 200 includes six nuggets 236.

In an alternative embodiment, a layer of thermal barrier material (not shown) is applied on combustor liner surface 210, and enhances the thermal protection of combustor liner surface 210 from high temperature combustion gases.

Liner 200 also includes an annular support flange, or aft flange 240. Specifically, support flange 240 couples an aft end 244 of liner 200 to the turbine nozzle assembly. More specifically, each support flange 240 includes a radial portion 246 and a conical datum area 248. Each radial portion 242 extends radially inwardly from an aft combustor inner liner panel 202 at inner liner aft end 244. Conical datum area 248 extends obliquely upstream and from aft flange 240 with respect to an axis of rotation of gas turbine engine 10. Conical datum area 248 includes a plurality of openings 250 extending therethrough. Openings 250 are sized to receive a plurality of fasteners 252 therethrough for securely fastening liner 200 to the turbine nozzle assembly.

Deteriorated regions of combustor liner 200 may be removed and replaced using the methods described herein. If a field returned engine, such as engine 10, indicates that combustor liner 200 includes at least one deteriorated panel 202, a cut is made circumferentially through combustor liner 200 to remove deteriorated panels 202 and support flange 240. More specifically, the cut is made through support flange 240, (as illustrated by line 260) such that support flange 240 is removable from combustor 30 after fasteners 252 are removed.

The above-described combustor liner replacement method is cost-effective and highly reliable. The method includes the steps of removing deteriorated portions from the combustor liner, such that deteriorated support flanges may be replaced. In one embodiment, deteriorated flanges are removed by cutting through axially through a portion of the support flange aft of any cooling features or nuggets included within the liner. As a result, a method is provided which enables deteriorated portions of combustor liners to be removed and replaced in a cost-effective and reliable manner.

Exemplary embodiments of combustor liner replacement are described above in detail. The methods are not limited to the specific embodiments described herein, but rather, aspects of each method may be utilized independently and separately from other methods described herein. Each combustor component can also be used in combination with other combustor components.

While the invention has been described in terms of various specific embodiments, those skilled in the art will recognize that the invention can be practiced with modification within the spirit and scope of the claims.

What is claimed is:

1. A method for replacing a portion of a gas turbine engine combustor liner, the combustor having a combustion zone formed by inner and outer liners, the inner and outer liners each including a series of panels, at least one of the inner and the outer liner including an aft support coupled to an aft end of liner, said method comprising:

cutting through at least one of the combustor inner and the outer liner upstream from the liner aft support;

removing the combustor liner aft support from the combustor; and installing a replacement aft support within the combustor such that the liner aft support extends aftward from the portion of the combustor liner that is upstream from the cut.

2. A method in accordance with claim 1 wherein said cutting through at least one of the combustor inner liner and the outer liner further comprises cutting through at least one of the combustor inner liner and the outer liner in a direction that is substantially parallel to an axis of rotation of the gas turbine engine.

3. A method in accordance with claim 1 wherein said installing a replacement aft support further comprises welding the liner aft support to the existing portion of at the cut liner that is secured within the combustor.

4. A method in accordance with claim 1 wherein the aft support is coupled to a conical datum flange, said installing a replacement aft support within the combustor comprises installing a replacement aft support including a conical datum flange within the combustor.

5. A method in accordance with claim 1 wherein the aft support is coupled to a conical datum flange, said method further comprising uncoupling the datum flange from the combustor.

6. A method in accordance with claim 1 wherein at least one of the inner liner and the outer liner includes a plurality of cooling nuggets formed by adjacent panels, said cutting through at least one of the combustor inner liner and the outer liner comprises cutting through at least one of the combustor inner liner and the outer liner panels downstream from the cooling nuggets.

7. A method for replacing a portion of a combustor liner within a gas turbine engine combustor, the combustor having a combustion zone formed by an inner and an outer liner, the inner and outer liners each including a series of panels, at least one of the inner liner and the outer liner includes a support flange formed at a downstream end of the liner, said method comprising:

cutting between an outer surface and an inner surface of at least one of the inner and the outer liners;

removing the portion of the at least one of the outer and inner liner that is aft of the cut; and installing a replacement liner into the combustor to replace the portion of the liner removed from the combustor.

8. A method in accordance with claim 7 wherein the combustor further includes an upstream end and a downstream end, said cutting between an outer surface and an inner surface further comprising the step of cutting through the at least one of the inner liner and the outer liner such that a portion of the liner including the support flange is uncoupled from the combustor.

9. A method in accordance with claim 8 wherein installing a replacement liner further comprises welding the replacement liner to the existing liner portion that is secured within the combustor.

10. A method in accordance with claim 8 wherein installing a replacement liner further comprises welding a replacement liner including a support flange to the existing liner portion that is secured within the combustor.

11. A method in accordance with claim 10 wherein welding a replacement liner further comprises securely coupling the replacement liner aft end to the combustor using the support flange.

12. A method in accordance with claim 8 wherein the support flange is coupled to a conical datum flange, said method further comprising uncoupling the datum flange from the combustor.

13. A method in accordance with claim 8 wherein the inner and outer liners each include a plurality of cooling nuggets formed by adjacent panels, said cutting through at least one of the combustor inner and outer liners comprises cutting through at least one of the combustor inner and outer liner panels downstream from at least one cooling nugget.

14. A method for replacing a portion of at least one deteriorated combustor liner within a gas turbine engine combustor, the at least one deteriorated liner including a plurality of cooling features formed by adjacent liner panels, the liner also including an aft end coupled to the combustor by a support flange, said method comprising:

cutting through the at least one deteriorated liner between from an outer surface of the liner to an inner surface of the liner;

removing the portion of the at least one deteriorated liner that is aft of the cut from the combustor; and installing a replacement liner into the combustor to replace the portion of the liner removed from the combustor.

15. A method in accordance with claim 14 wherein removing the portion of the deteriorated combustor liner that is aft of the cut comprises:

uncoupling the support flange; and removing the deteriorated liner such that the support flange is removed with the portion of the liner being removed.

16. A method in accordance with claim 14 wherein the liner includes a plurality of cooling features formed by overhanging portions of adjacent liner panels, said cutting through the deteriorated liner from an outer surface of the liner to an inner surface of the liner comprises cutting through the liner aft of the liner cooling features.

17. A method in accordance with claim 16 wherein installing a replacement liner further comprises welding the replacement liner to the existing portion of the liner that is secured within the combustor.

18. A method in accordance with claim 14 wherein welding a replacement liner further comprises securely coupling the replacement liner aft end to the combustor using the support flange.

19. A method in accordance with claim 14 wherein the support flange is coupled to a conical datum flange, said method further comprising uncoupling the datum flange from the combustor.

20. A method in accordance with claim 14 wherein the support flange is coupled to a conical datum flange, said removing the deteriorated liner such that the support flange and the datum flange are removed with the portion of the liner being removed.

* * * * *